Aug. 6, 1940.   C. W. KUHN   2,210,035
REFRIGERATING SYSTEM
Filed Oct. 2, 1936

Inventor
Clarence W. Kuhn
By Frank H. Hubbard
Attorney

Patented Aug. 6, 1940

2,210,035

UNITED STATES PATENT OFFICE 2,210,035

REFRIGERATING SYSTEM

Clarence W. Kuhn, Wauwatosa, Wis., assignor to Cutler-Hammer, Inc., Milwaukee, Wis., a corporation of Delaware Application October 2, 1936, Serial No. 103,682

3 Claims. (Cl. 62—4)

This invention relates to refrigerating systems, and while not limited thereto is particularly applicable to devices for controlling electric refrigerators of the domestic or small commercial type.

Electric refrigerators of the domestic type are usually controlled by a switch which is directly responsive to the temperature of the evaporator. Such switch is set to normally maintain the temperature of the evaporator between predetermined limits which are sufficiently low to freeze substances placed within the evaporator and to also effect proper cooling of the food compartment of the refrigerator for general refrigerating purposes. However, in practice it has been found that under certain conditions such temperature limits are not sufficiently low to effect proper cooling of the food compartment, as for example when large quantities of warm substances are placed within said compartment.

The present invention has among its objects to provide an improved control device for electric refrigerators which acts to automatically control the temperature of the evaporator to provide for increased cooling of the food compartment under the aforementioned condition or under other conditions tending to raise the temperature of the food compartment to an undesirable degree.

Another object is to provide a control device of the aforesaid character in which the various control elements are included in a rugged and compact unitary structure.

Various other objects and advantages of the invention will hereinafter appear.

The accompanying drawing illustrates an embodiment of the invention which will now be described, it being understood that the embodiment illustrated is susceptible of modification without departing from the spirit and scope of the appended claims.

Figure 1:
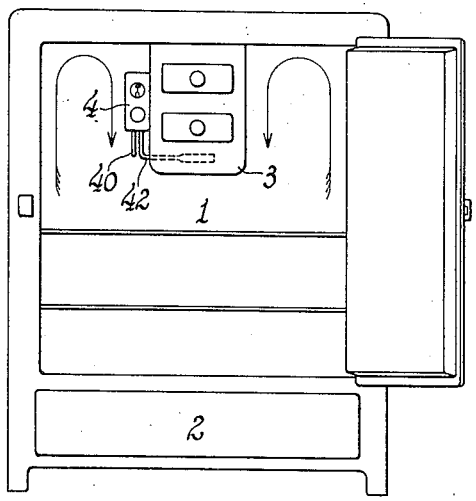
Figure 1 is a front elevational view of a refrigerator equipped with a control device embodying the invention.

Referring to Fig. 1, the same illustrates an electric refrigerator of a conventional type having a cabinet provided with a food compartment 1 and an enclosed machine compartment 2. An evaporator 3 is mounted within the food compartment 1 and said evaporator is supplied with a refrigerant by a motor driven machine (not shown) which is mounted within the compartment 2 and is controlled by a switch 4. Switch 4 may be mounted upon one side of the evaporator and as hereinafter set forth said switch is responsive to the temperature of the evaporator and also to the temperature of the air circulating in the food compartment 1.

Figure 2:
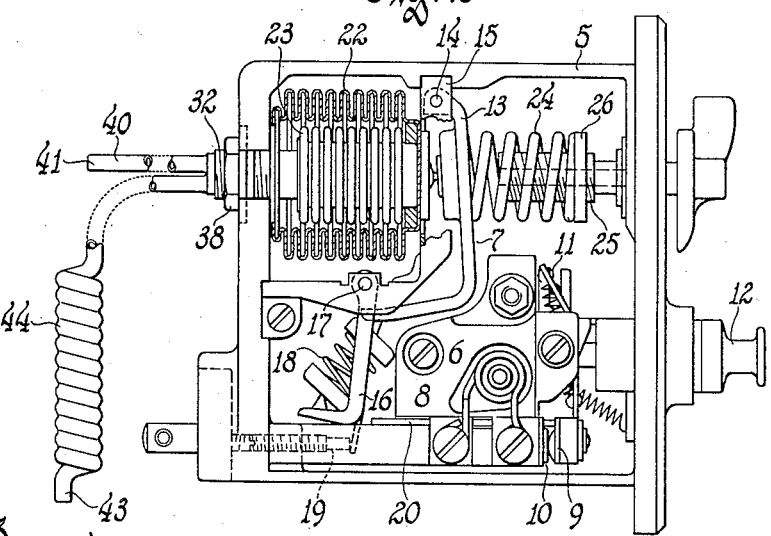
Fig. 2 is a side elevational view of the control device shown in Fig. 1, the cover for the enclosing casing of the device being removed and portions of the operating mechanism being shown in section.
Figure 3:
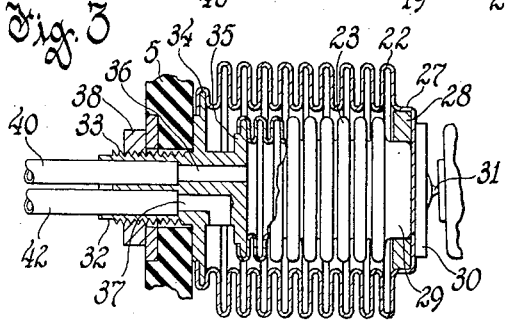
Fig. 3 is a detail sectional view of certain of the parts shown in Fig. 1.

Referring now to Fig. 2, the invention is shown in connection with a refrigerator control device of the type shown in my copending application Serial No. 708,804, filed January 29, 1934, but it may be used in connection with control devices of other types.

Briefly, the refrigerator control device shown in Fig. 2 includes a box-shaped enclosing casing 5 having a switch unit 6 mounted therein which is provided with a snap operating mechanism 7. Said switch unit includes an insulating base 8 which carries a bridging contact element 9 and a pair of cooperating stationary contacts, one of which is illustrated at 10. Contact element 9 is movable into and out of engagement with its cooperating contacts by an over-center spring 11 which is operatively connected to a knob 12 slidably mounted within an opening in the front wall of casing 5. With knob 12 in the position shown, spring 11 is positioned to yieldingly hold contact element 9 in engagement with its cooperating stationary contacts 10 and upon outward movement of said knob said spring is shifted with respect to said contact element to move the latter into open position with a snap action. The switch unit 6 also has a free tripping overload mechanism associated therewith which is adapted to act under overload conditions in the energizing circuit of the refrigerator to move contact element 9 into open position through the medium of spring 11. However, the overload mechanism need not be considered for the purpose of this invention.

The snap operating mechanism 7 includes a vertically arranged lever 13 pivoted at 14 upon a bracket 15 fixed within casing 5, a second vertically arranged lever 16 pivoted at 17 upon said bracket and an over-center spring 18 which is held under compression between the free ends of the levers 13 and 16. Movement of lever 16 is limited in one direction by insulating base 8 and in an opposite direction by an adjustable stop 19 secured to the rear wall of casing 5, and said lever is arranged to operate the movable contact element 9 through the medium of an insulating bar 20 slidably mounted within a recess in insulating base 8.

Upon clockwise movement of lever 13 into a position wherein the axis of spring 18 is located to the left of pivot 17, lever 16 is moved with a snap action out of the position shown in the drawing to move bridging contact element 9 out of engagement with its cooperating stationary contacts 10. Upon return movement of lever 13 in a counterclockwise direction into a position wherein the axis of spring 18 is located to the right of pivot 17, the lever 16 returns with a snap action into the position shown in the drawing to permit movement of bridging contact element 9 into engagement with its cooperating stationary contacts 10.

In accordance with the present invention lever 13 has a pair of temperature responsive bellows 22 and 23 associated therewith which are adapted to act jointly to move said lever in a counterclockwise direction against the action of a loading spring 24. The loading spring 24 may be provided with adjusting means of the character disclosed in my aforementioned copending application, such means comprising an adjusting screw 25 rotatably mounted in the front wall of casing 5 and having a nut 26 associated therewith which engages the front end of said spring.

The bellows 22 and 23 are cup-shaped and the latter is contained within the former and centrally arranged with respect thereto. The closed end of bellows 22 is provided with a circular projection 27 which contains an annular washer 28 and the closed end of bellows 23 is provided with a circular projection 29 which fits within the opening in said washer. The face of projection 27 has a washer 30 soldered thereto which is provided with a centrally arranged conical projection 31 engaging within an indentation on the rear face of lever 13. The bellows 22 and 23 are both carried by a fitting 32 comprising an externally threaded stem 33 having spaced circular flanges 34 and 35 on the front end thereof. The open end of bellows 22 is crimped over the flange 34 while the open end of bellows 23 is crimped over the flange 35 and each of said bellows is soldered to its associated flange to hermetically seal the same thereto. The stem 33 is provided with drilled openings 36 and 37, the former opening extending from the rear of said stem and communicating with the space within bellows 23 and the latter extending from the rear of said stem and communicating with the space between bellows 22 and bellows 23. The rear wall of casing 5 is provided with an opening for receiving the stem 33 of fitting 32 and the flange 34 of said fitting is clamped against said wall by a nut 38 on the rear end of said stem.

A tube 40 having a closed end 41 is hermetically sealed within the opening 36 in the stem 33 and a tube 42 having a closed end 43 is hermetically within the opening 37 in said stem. Tube 42 is provided with a coiled bulb portion 44 and as shown in Fig. 1 said bulb portion is arranged in intimate contact with the evaporator 3. Also as shown in Fig. 1 the tube 40 extends into the food compartment 1 of the refrigerator.

The tubes 40 and 42 are each filled with a suitable vaporizable fluid, as for example methyl chloride or sulphur dioxide. The fluid in tube 40 provides a vapor pressure within bellows 23 which is proportional to the temperature of the air circulating in the food compartment 1 while the fluid in tube 42 produces a vapor pressure within bellows 22 which is proportional to the temperature of the evaporator.

It is thus apparent that the bellows 22 is adapted to act through the medium of the snap operating mechanism 7 to move bridging contact 9 into and out of engagement with stationary contacts 10 for starting and stopping of the refrigerator at temperature values within the evaporator which are determined by the setting of spring 24 and the vapor pressure within bellows 23. Obviously an increase in vapor pressure within bellows 23 causes the bellows 22 to effect openings and closure of the switch 6 at lower temperature values within the evaporator, while a decrease in pressure within the bellows 23 has an opposite effect. The bellows 22 thus acts to control the operation of the switch in accordance with the temperature of the evaporator and the bellows 23 acts as a modifying means to lower the temperature of the evaporator upon an increase in temperature within the food compartment and to raise the temperature of the evaporator upon a decrease in temperature within the food compartment. The switch can thus be set to normally maintain the temperature of the evaporator between predetermined limits which are sufficiently low to freeze substances placed within the evaporator and to also effect proper cooling of the food compartment for general refrigerating purposes. Also the bellows 23 can be readily designed to effect lowering of the normal temperature limits of the evaporator to provide for increased cooling, as for example when large quantities of warm substances are placed within the food compartment.

In connection with the foregoing it should be noted that by arranging the bellows 22 and 23 in the manner aforedescribed a very compact and simple structure is obtained for effecting the aforedescribed control. Also it should be noted that the aforedescribed temperature responsive mechanism can be readily applied to existing types of switches without materially changing the design thereof.

What I claim as new and desire to secure by Letters Patent is:

1. The combination with an electric refrigerator, of a control unit therefor including an enclosing casing, a control switch mounted within said casing and having an operating element movable in opposite directions between extreme circuit opening and circuit closing positions, a loading spring associated with said operating element for biasing the same toward circuit opening position and a pair of bellows responsive to temperatures in different parts of said refrigerator and arranged to act jointly to move said operating element into circuit closing position against the action of said loading spring, said pair of bellows being mounted within said enclosing casing and being arranged one within the other.

2. The combination with an electric refrigerator, of a control unit therefor including an enclosing casing, a snap switch mechanism mounted within said casing and having an operating part movable in opposite directions between extreme circuit opening and circuit closing positions, a loading spring for opposing movement of said operating part out of one of said extreme positions and a pair of thermostats for controlling said operating part, said thermostats being responsive to temperatures in different parts of said refrigerator and each including a cup-shaped bellows expansible in a direction to move said operating part against the action of said loading spring, said bellows being arranged one within the other and a common support for said bellows fixed to said enclosing casing and sealed within the opening in each of said bellows, said support having two openings therein each communicating with the space within one of said bellows.

3. The combination with an electric refrigerator including a cooling chamber and an evaporator therein, of a control unit for said refrigerator including an enclosing casing, a control switch for said refrigerator mounted within said casing and having an operating part movable in opposite directions between extreme circuit opening and circuit closing positions, a loading spring for opposing movement of said operating part out of circuit opening position, a thermostat responsive to the temperature of said cooling chamber, a second thermostat responsive to the temperature of said evaporator, said thermostats including a pair of cup-shaped bellows arranged one within the other and each expansible in a direction to move said operating member against the action of said loading spring, and a common support for said bellows fixed to said casing and sealed within the openings in said bellows.

CLARENCE W. KUHN.